(12) United States Patent
Fattal et al.

(10) Patent No.: US 9,354,398 B2
(45) Date of Patent: May 31, 2016

(54) OPTICAL CONNECTORS

(75) Inventors: David A. Fattal, Mountain View, CA (US); Raymond G. Beausoleil, Redmond, WA (US); Marco Fiorentino, Mountain View, CA (US); Paul Kessler Rosenberg, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 119 days.

(21) Appl. No.: 14/364,082

(22) PCT Filed: Jan. 10, 2012

(86) PCT No.: PCT/US2012/020804
§ 371 (c)(1),
(2), (4) Date: Jun. 10, 2014

(87) PCT Pub. No.: WO2013/105935
PCT Pub. Date: Jul. 18, 2013

(65) Prior Publication Data
US 2015/0063750 A1 Mar. 5, 2015

(51) Int. Cl.
*G02B 6/32* (2006.01)
*B29D 11/00* (2006.01)
*G02B 6/38* (2006.01)
*G02B 3/00* (2006.01)

(52) U.S. Cl.
CPC .............. *G02B 6/32* (2013.01); *B29D 11/0075* (2013.01); *B29D 11/00692* (2013.01); *G02B 6/3885* (2013.01); *G02B 3/0087* (2013.01)

(58) Field of Classification Search
CPC ..................... B29D 11/00692; B29D 11/0075; G02B 3/0087; G02B 6/3885; G02B 6/32
USPC ...................................... 385/31–39; 264/1.26
See application file for complete search history.

(56) References Cited

U.S. PATENT DOCUMENTS

| 3,444,863 | A | * | 5/1969 | Soehngen | ............ | A24D 3/0237 131/341 |
|---|---|---|---|---|---|---|
| 5,172,271 | A | | 12/1992 | Sinclair | | |
| 5,238,613 | A | * | 8/1993 | Anderson | ................. | A61F 2/14 210/500.27 |
| 5,513,289 | A | | 4/1996 | Hosokawa et al. | | |
| 5,585,968 | A | | 12/1996 | Guhman et al. | | |
| 6,448,556 | B1 | * | 9/2002 | Cowley | ................... | H01J 37/12 250/311 |
| 7,181,106 | B2 | | 2/2007 | Ushiro et al. | | |
| 7,194,016 | B2 | | 3/2007 | Bullington et al. | | |
| 7,386,205 | B2 | | 6/2008 | Wang et al. | | |
| 2004/0027682 | A1 | | 2/2004 | Tsunetomo | | |
| 2004/0165822 | A1 | | 8/2004 | Kobayashi et al. | | |
| 2004/0184156 | A1 | | 9/2004 | Gunn et al. | | |
| 2009/0190231 | A1 | | 7/2009 | Lenchenkov | | |
| 2009/0202202 | A1 | | 8/2009 | Lee et al. | | |
| 2009/0324175 | A1 | | 12/2009 | Everett et al. | | |
| 2012/0028029 | A1 | * | 2/2012 | Pacholski | ............... | B82Y 30/00 428/315.5 |
| 2012/0034291 | A1 | * | 2/2012 | Amsden | ................. | B82Y 10/00 424/443 |
| 2013/0338303 | A1 | * | 12/2013 | Quint | ....................... | B05D 1/18 542/555 |
| 2015/0015930 | A1 | * | 1/2015 | Hussein | ................. | G02B 1/002 359/240 |

FOREIGN PATENT DOCUMENTS

| JP | S5934507 A | 4/1984 |
|---|---|---|
| JP | 2000231028 A | 8/2000 |
| WO | WO-2011129814 A1 | 10/2011 |

OTHER PUBLICATIONS

Extended European Search Report received in EP Application No. 12865019.9, Aug. 24, 2015, 8 pages.
Vo. S. et al., "Sub-Wavelength Grating Lenses With a Twist, " Photonics Technology Letters, IEEE 26.13, 2014, pp. 1375-1378.
Fattal, D., et al., A Silicon Lens for Integrated Free-Space Optics, Advanced Photonics, OSA Technical Digest (CD) (Optical Society of America, 2011), paper ITuD2, Jun. 12-15, 2011, 3 pages.
International Search Report & Written Opinion, Jul. 31, 2012, PCT Patent Application No. PCT/US2012/020804, 8 pages.

* cited by examiner

*Primary Examiner* — Akm Enayet Ullah
(74) *Attorney, Agent, or Firm* — Fabian VanCott

(57) ABSTRACT

An optical connector includes a first optical fiber and a second optical fiber. A first planar lens is positioned to operate on light exiting the first optical fiber to create a predetermined change in a wave front of the light. A second planar lens is positioned to accept the light from the first planar lens, the second planar lens focusing the light onto the second optical fiber. The first planar lens and second planar lens each include a regularly spaced array of posts with periodically varying diameters.

20 Claims, 6 Drawing Sheets

OPTICAL CONNECTORS

BACKGROUND

Light beams are frequently used to transmit optical energy or data. For example, light beams can be used to transmit data over large distances, between electronic components on nearby circuit boards, between optical fibers, or between electronic components on a single circuit board.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
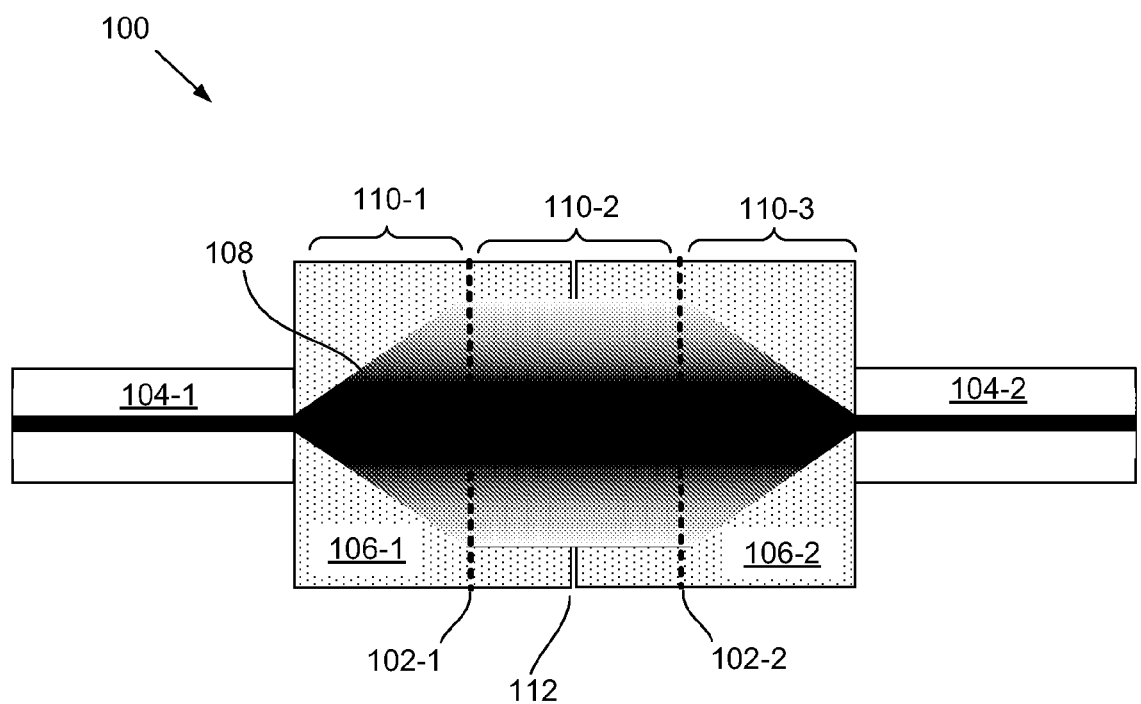
FIG. 1 is a cross sectional diagram of a fiber connection that utilizes a planar CMOS compatible lens to collimate and focus the light, according to one example of principles described herein.

Three dimensional optics can be relatively bulky and expensive. For example, to transmit optical beams over large distances, between electronic components on nearby circuit boards or between optical fibers, optical elements such as three dimensional lenses are used. Unfortunately, these three dimensional elements remain a bulky technology with very little prospect of dense integration.

The specification below describes application of a planar CMOS compatible lens made from an array of silicon posts with a diameter distribution tailored to produce a desired arbitrary transmitted wave front. The lens is polarization insensitive and can be designed at any given visible or infrared wavelength.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

An expanded beam connector can be used to guide light between two optical fibers. The optical fibers include a transparent core surrounded by a cladding material. Light is guided along the core by total internal reflection. The diameter of the core is typically very small, with single mode fibers having diameters less than 10 microns. Connecting these optical fibers together can be challenging. The ends of the fibers are carefully cleaved and then spliced together mechanically or fused together using heat. Misalignments between the fibers can result in a significant loss of light. For example, a misalignment of 5 microns when joining 10 micron diameter fiber may result in an unacceptable loss of light.

One approach to connecting optical fibers involves expanding the optical beam exiting a first fiber to a larger diameter and then focusing the optical beam back into a second fiber. Macroscopic three-dimensional lenses, such as ball lenses, can be used to expand and collimate the optical beam. To focus the light back into a second fiber, another three-dimensional lens is used focus the light onto the end of the second fiber.

The sensitivity to misalignment at the interface is significantly reduced because of the greater diameter of the optical beam at the interface. This allows mechanical tolerances to be relaxed and the connection to be manufactured at lower cost. Additionally, the connection is less sensitive to imperfections such as scratches or dust.

However, the use of macroscopic three-dimensional optics to make a connection between optical fibers may have a number of disadvantages. For example, the ball lenses can be expensive to make and mount. The use of ball lenses drives the overall size of the connector and limits the diameter of the collimated beam. Further, the surface profile and material of the ball lens may not produce the desired beam collimation or be suitable for the desired optical wavelength. For example, most infrared materials are not suitable for fabricating ball lenses.

FIG. 1 is a cross sectional diagram of an optical fiber connection (100) that utilizes a planar CMOS compatible lens to collimate and focus the light. The fiber connection (100) includes two optical fibers (104-1, 104-2), a transparent matrix material (106-1, 106-2) and planar lenses (102-1, 102-2) positioned in the matrix material. A first block of matrix material (106-1) with its embedded planar lens (102-1) is joined to the first optical fiber (104-1). A second block of matrix material (106-2) with its embedded planar lens (102-2) is joined to the second optical fiber (104-2). The two blocks of matrix material (106-1, 106-2) are joined at an interface (112). In this case, the interface occurs where planar face of the first matrix is secured to a planar face of the second matrix. The light (108) contained within the first fiber (104-1) exits into the matrix material (106-1) and expands. The angle and distribution of the light (108) in the expansion section (110-1) is determined by a number of factors, including the exit diameter of the fiber, the presence of optical imperfections matrix material (106-1) and the index of refraction of the matrix material (106-1). The light (108) then encounters the first embedded planar lens (102-1). The first planar lens is positioned to operate on light exiting the first optical fiber to create a predetermined change in a wave front of the light. In this example, the first planar lens (102-1) collimates the light. The light (108) passes through center section (110-2) that includes the rest of the matrix material (106-1), crosses the interface (112), and enters the second block of matrix material (106-2). The light (108) then encounters a second planar lens (102-2) and is focused as it passes through the right portion (110-3) into the second optical fiber (104-2).

The approach shown in FIG. 1 has a number of advantages over the use of three-dimensional optics such as ball lenses. The planar lenses (102-1, 102-2) are encapsulated in the matrix material (106-1, 106-2) to form a monolithic block. This increases the robustness and maintains the alignment within the connector (100). The planar lenses (102-1, 102-2) can also be inexpensively produced and create an arbitrary change in the wave front of an optical beam. The planar lenses (102-1, 102-2) are significantly thinner than the ball lenses, resulting in more compact connections. In one example, the optical axis of the planar lens may be substantially perpendicular to the plane of the lens. The optical axis is an imaginary line along which there is some degree of rotational symmetry in the optical system. In other implementations, the optical axis may be tilted at an angle from the plane of the lens.

Figure 2A:
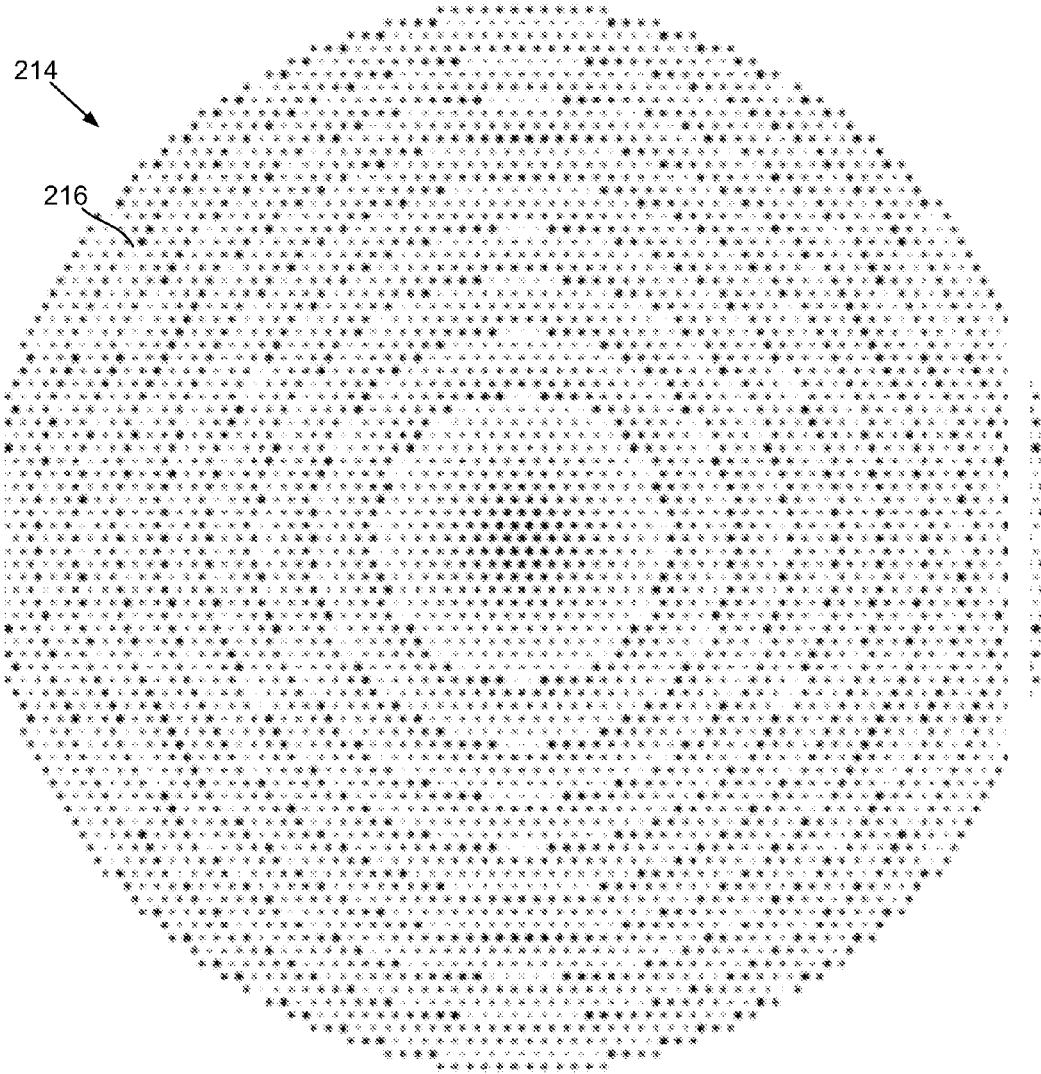
FIG. 2A is a top view of the planar lens showing the regular spacing of the silicon posts and the variation in diameter of the posts, according to one example of principles described herein.
Figure 2B:
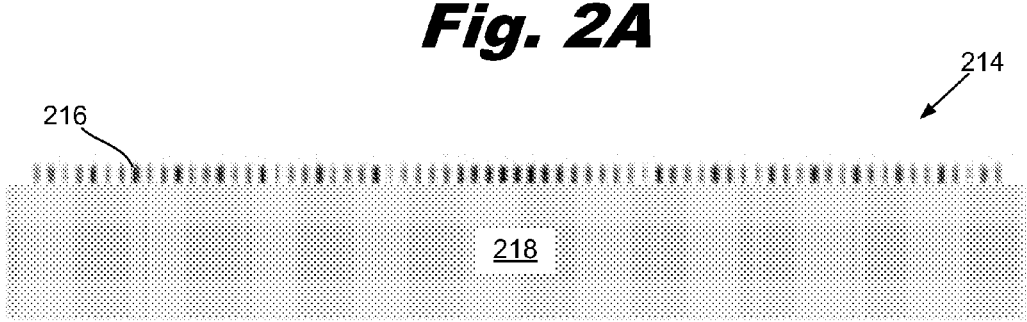
FIG. 2B is a cross sectional view of the planar lens, according to one example of principles described herein.

In one implementation, the planar lens is a silicon lens that includes a regular two-dimensional array of silicon posts. An example of a planar lens is shown in FIGS. 2A and 2B. The spatial variation of the diameter of the posts allows for arbitrary transformation of the transmitted wavefront. The planar lens has high overall efficiency and does not alter the polarization state of the light. Further, the polarization insensitive nature of the planar lens allows it to uniformly operate on optical beams with any polarization. The planar lens can be designed at any wavelength of interest in the visible and near-IR wavelength range.

FIG. 2A is a top view of the planar lens (214) showing the regular spacing of the silicon posts (216) and the variation in diameter of the posts. The larger and darker dots represent posts with larger diameters, while the smaller dots represent posts with smaller diameters. The diameters of the posts in the regularly spaced array vary periodically. In this example, the array is made up of regularly shaped and spaced hexagonal cells, but other array patterns, such as rectangular patterns could be used.

In this example, the different diameters of the posts create a concentric pattern of circles on the face of the lens. Each circle is made up posts with similar diameters. A circle formed from posts with large diameters has larger and smaller circles formed from posts with smaller diameters on either side to create a "bull's eye" pattern. A variety of other patterns could be formed, including spirals, ellipses, and other suitable geometries. In this example, the planar lens (214) has a diameter of 20 microns and a 5 micron focal length for light with a wavelength of 650 nanometers. However, the planar lens (214) could be constructed in a wide variety of sizes, focal lengths, and wavelengths. The planar lens (214) illustrated in FIGS. 2A and 2B is capable of focusing light to a diffraction limited spot. The planar lens (214) can be designed to implement any wave front transformation while always preserving the polarization of the input light.

FIG. 2B is a cross sectional view of the planar lens (214). The planar lens (214) in this example includes an array of silicon posts (216) that have been lithographically formed on a silicon oxide substrate (218). In general, planar lens can be formed from a variety of dielectric materials. In one example, the regular array of posts is made of lithographically formed posts of a dielectric disposed on a dielectric substrate with a refractive index substantially lower than the posts. In this context, the term "substantially" refers to a difference in index of refraction that is sufficient to provide the desired change in the curvature of the incident wave front. For example, silicon dioxide has an index of refraction of approximately 1.45 and silicon has an index of refraction of approximately 5.5 to 3.5 depending on the wavelength of interest.

The discussion above describes specific examples of geometries that can be used to form a planar lens. Additionally or alternatively, the planar lens may be formed with different materials and geometries. For example, the posts may also be formed from a combination of two or more different dielectric materials. In some implementations, the areas between the posts can be filled with a dielectric that has a lower optical index than the posts. The cross sectional shape of the posts can be cylindrical, square, rectangular, elliptical, or other suitable shape. Posts with cross sections that have one dimension that is significantly greater than the other dimension can introduce polarization dependence. In circumstances where polarization dependence is desirable, the posts can be formed with high aspect ratio cross sectional shapes that are aligned within the array to produce the desired polarization dependence. In some examples, the same substrate may have multiple discrete planar lenses formed on its surface.

The array of silicon posts (216) can be formed in a variety of ways, including photolithographic, nanoimprint, and other techniques. For example, the creation of an array of silicon posts (216) can be performed in a single photolithograph operation. The diameters and height of the posts (216) can be designed for compatibility with both the selected wavelengths and the selected fabrication technique.

To design a planar lens at a particular wavelength, a variety of parameters can be considered. For example, the silicon layer thickness and array spacing constant can be guided by the following principles:
  (i) The phase variation can be selected (possibly up to and including phase variations of $2\pi$) as the duty cycle is varied in some practical range dictated by fabrication constraints.
  (ii) Abrupt phase changes across small ranges can be avoided, as they will allow less tolerance in fabrication errors.
  (iii) The aspect ratio of the post is selected to be compatible with fabrication constraints.
  (iv) The average transmission efficiency can be maximized when other constraints are met.

A variety of other constraints can also be considered. The first three considerations (i-iii) can be met at any wavelength from the blue to the IR end of the spectrum. Further, the choice of parameters is not unique. A variety of combinations can be selected. For example, simulations of periodic 2D gratings show that $2\pi$ phase differentials at high transmissivity occur almost periodically as the silicon post height is increased, starting at a minimum value of roughly half of the optical wavelength. The hexagonal lattice can be selected to have a similar but slightly smaller value. In general, absorption losses are minimized when shorter posts are used. For example, the planar lenses may include posts that are perpendicular to the substrate and have a height which is approximately half of a wavelength of light designed to be passed through the connector.

As discussed above, the planar lenses may make a wide range of changes to incident wave fronts. In the example shown in FIG. 1, first planar lens and second planar lens are axially symmetric convergent lenses with optical axes that are perpendicular to the substrate. The planar lenses can be used in a variety of mediums that have a sufficiently large index contrast with the post material. For instance the planar lenses can be used in air, liquid, or embedded in a solid material such as glass or polymer.

Figure 3:
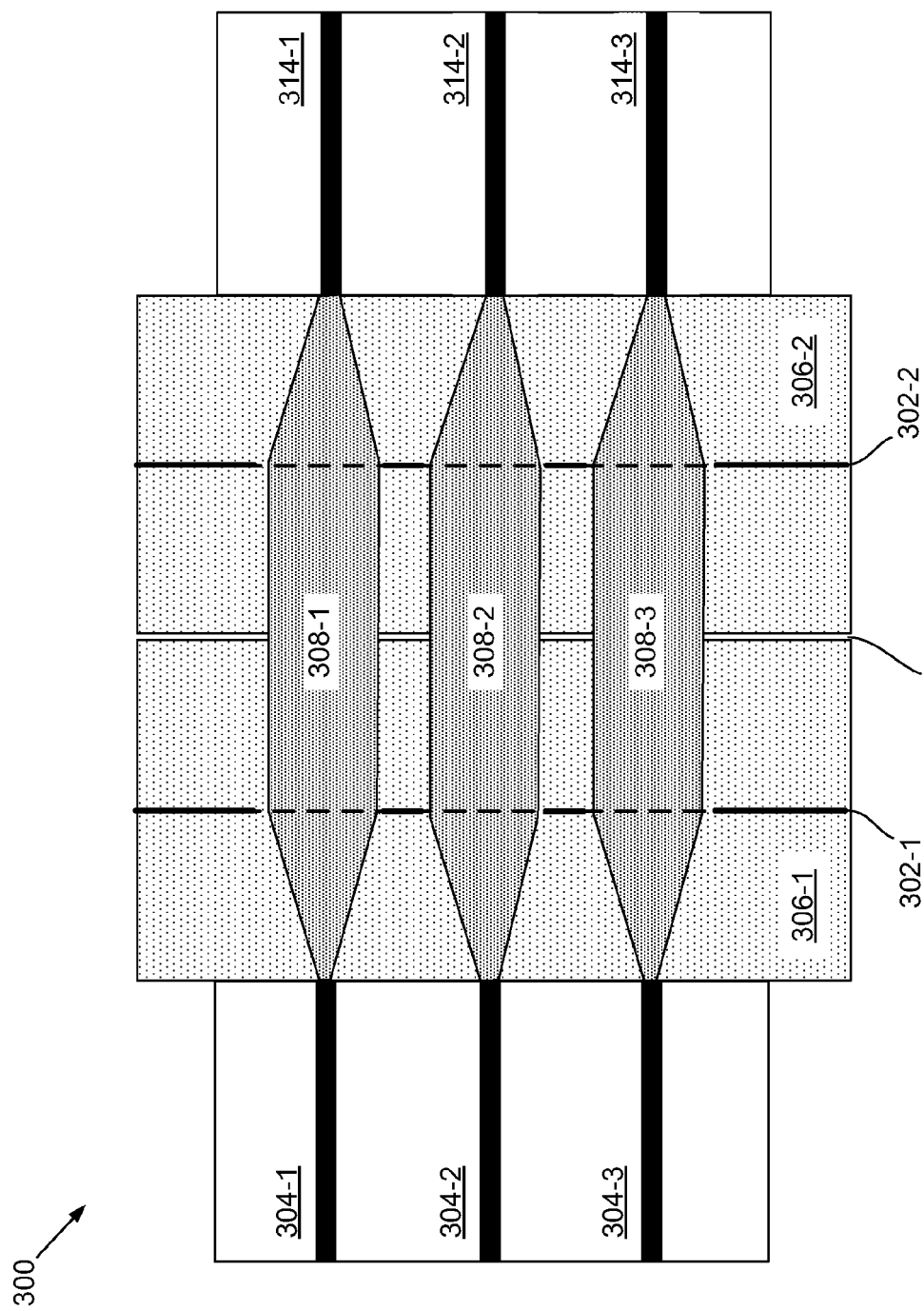
FIG. 3 is a cross sectional diagram of a multi-fiber connector in which the planar lenses simulate multiple small lenses that direct light from a first group of fibers to a second group of fibers, according to one example of principles described herein.

FIG. 3 is a cross sectional diagram of a multi-fiber connector in which the planar lenses (302) simulate multiple small lenses that direct light from a first group of fibers (304) to a second group of fibers (314). Using one pair of planar lenses (302) to collimate and refocus light between multiple fibers can reduce the overall cost and manufacturing complexity. In this example three fibers (304) direct three beams of light (308) into a first matrix (306-1). As the beams exit the fibers (304) they expand within the matrix (306-1) and encounter the first planar lens (302-1). The first planar lens (302-1) collimates the light (308) into three parallel beams that pass across an interface (312) and into the second matrix (306-2) where they encounter a second planar lens (302-2) and are focused into the second three fibers (314).

Figure 4:
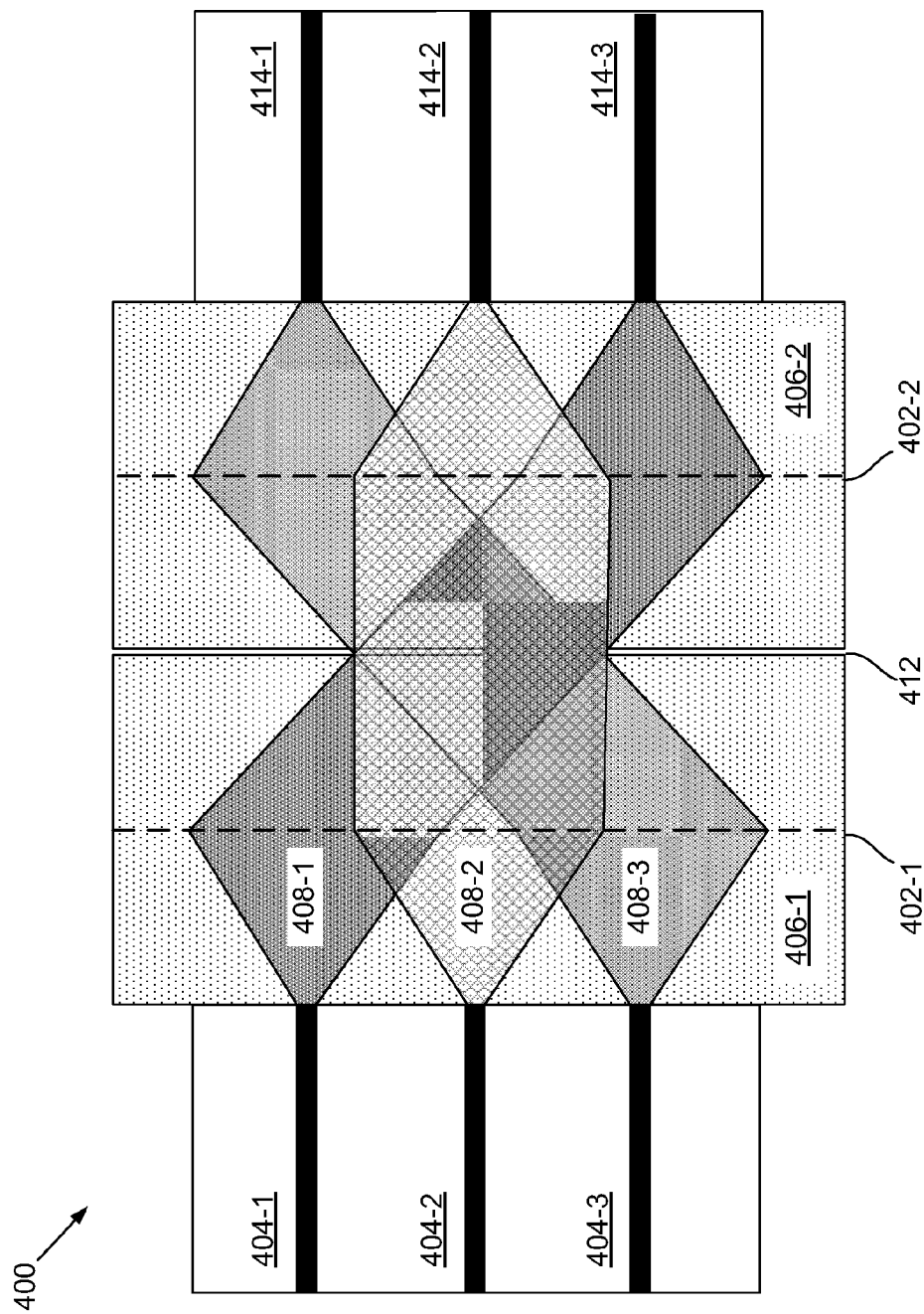
FIG. 4 is a cross sectional diagram of a multi-fiber connector, according to one example of principles described herein.

FIG. 4 is a cross sectional diagram of a multi-fiber connector (400). In this example, the planar array of posts acts as a single big lens (402-1) and directs a first beam (408-1) from an upper fiber (404-1) through the first matrix (406-1), across the interface (412) and through the second matrix (406-2) to a second planar lens (402-2). The second planar lens (402-2) focuses the beam onto a lower fiber (414-3) on an opposite side of the connector (400). The center beam (408-2) is emitted from the center fiber (404-2) and directed to the opposing center fiber (414-2). A third beam (408-3) is emitted from a lower fiber (404-3) on the left side of the connector (400), transmitted through the matrices (406-1) and interface (412) where it is similarly focused onto an upper fiber (414-1) on the right side of the connector (400).

A planar lens can be designed as any of a number of lens types, including a transmissive optical lens. Typically transmissive optical lenses manipulate wave fronts that are substantially normal to the plane of the lens as opposed to wave fronts that are parallel to the plane of the lens. In one example, the planar lens is an axially symmetric convergent lens. The planar lens accepts collimated light that is substantially parallel to its axis of symmetry. As the light passes through the lens, it is focused on the opposite side of the lens at a point on the axis of symmetry.

Figure 5A:
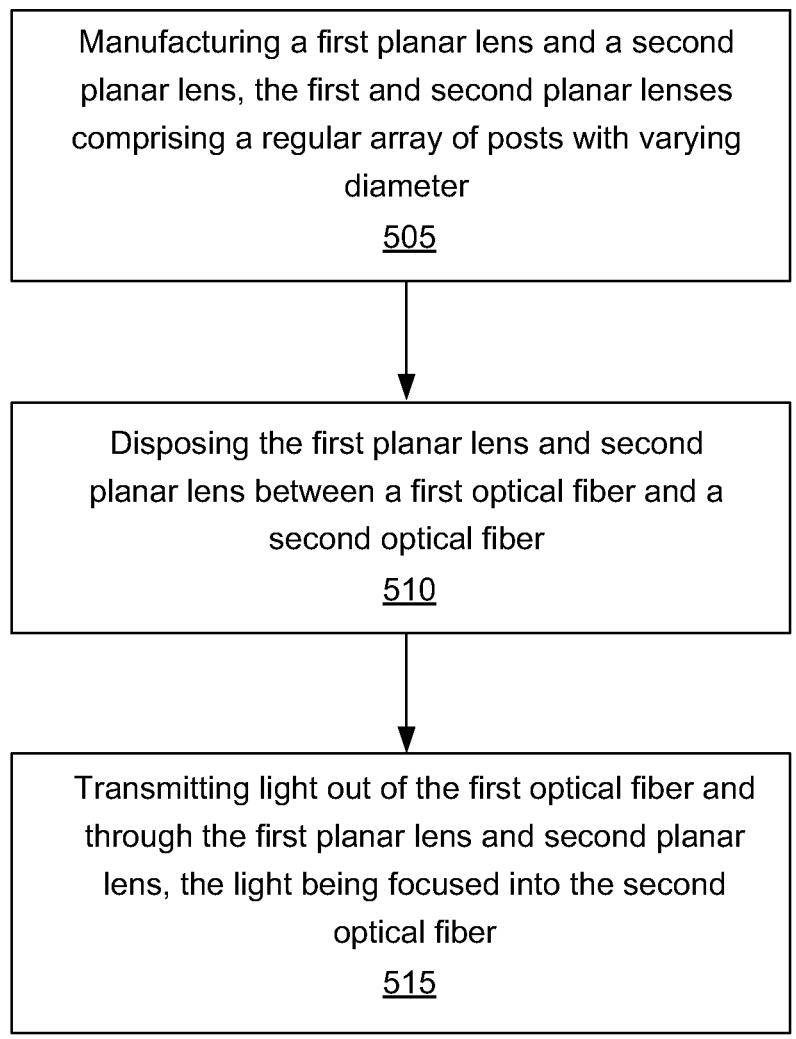
FIGS. 5A and 5B show illustrative methods for making and using a connector that incorporates planar lenses, according to one example of principles described herein.

FIG. 5A is an illustrative method (500) for making and using a connector that incorporates planar lenses. A first planar lens and a second planar lens are manufactured. Each of the first planar lenses includes a regular array of posts with varying diameter (block 505). The planar lenses can be manufactured from a variety of materials, including glass, plastic, semiconductor, or other material that is substantially optically transparent at the desired wavelength or range of wavelengths. The first planar lens and second planar lens are disposed between a first optical fiber and a second optical fiber (block 510). Light is transmitted out of the first optical fiber and through the first planar lens and second planar lens. The light is focused into the second optical fiber (block 515).

Figure 5B:
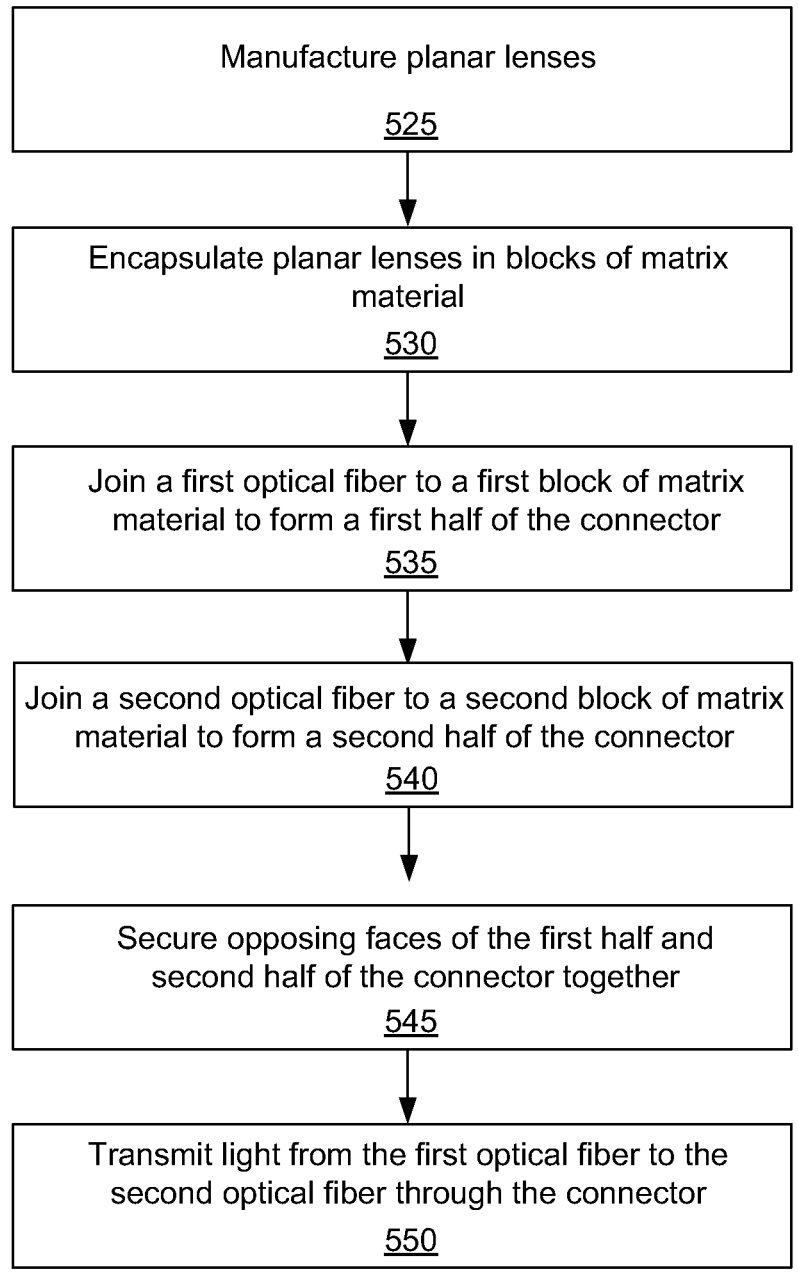

FIG. 5B is an illustrative method for making and using a connector that incorporates planar lenses. The planar lenses are manufactured (block 525). According to one embodiment, the planar lenses include an array of posts which are evenly arranged and positioned at recurring intervals. For example, the planar lenses could be formed using photolithography to create a regular hexagonal array of silicon pillars on a silicon oxide substrate. The planar lens is antireflective by design. An additional antireflective coating can also be added.

The planar lenses are encapsulated in blocks of matrix material (block 530). The matrix material typically has an index of refraction that is different than the planar lenses. Alternatively, the planar lenses could be adhered to a free surface of the matrix material or be used without the matrix material.

A first optical fiber is joined to a first block of matrix material to form a first half of the connector (block 535). The optical fiber may be joined to the matrix material in a variety of ways including pushing the optical fiber into a hole machined in the first block of matrix material. Alternatively, the optical fiber and the planar lens could be placed into a mold and the matrix material molded around the fiber and lens. A second optical fiber is similarly joined to a second block of matrix material to form a second half of the connector (block 540). The blocks may have any appropriate shape, including square, rectangular, or cylindrical shapes. The joining of the fibers to the matrix material ensures that the fibers are correctly positioned with respect to the planar lens.

Opposing faces of the first half and second half of the connector are secured together (block 545). Typically the opposing faces are planar faces. These planar faces and other surfaces of the matrix and/or planar lenses can also be coated with an antireflective coating. A variety of techniques could be used to secure the two halves of the connector together. For example, in a configuration that is designed to be later disconnected, a spring force could press the opposing faces of the connector together. Alternatively, in a connector that is designed to be permanent, the planar faces may be glued together with an adhesive such as an index matching glue. Light is then transmitted from the first optical fiber to the second optical fiber through the connector (block 550).

The methods described above is only examples. The various blocks shown in FIGS. 5A and 5B and described above could be reordered, deleted, combined, or new blocks could be added. For example, the encapsulation of the planar lenses in the matrix material and joining of the optical fibers with the matrix material could be done simultaneously.

In sum, planar lenses used in a fiber connector provides a flat topology and allows for new assembly and packaging methods. The planar lenses are more compact, easier to mount, and can be very densely packed together. The planar lens also provides freedom in designing custom phase front transformation by changing the diameters of the posts in the array. This allows for the correction of aberrations and lower insertion losses. When the posts are formed on an oxide substrate, the planar lens is significantly more robust and resistant to temperature changes than plastic lenses, which tend to deform when heated.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An optical connector comprising:
   a first optical fiber;
   a second optical fiber;
   a first planar lens positioned to operate on light exiting the first optical fiber to create a predetermined change in a wave front of the light;
   a second planar lens positioned to accept the light from the first planar lens, the second planar lens to focus the light into the second optical fiber;
   in which the first planar lens and second planar lens each comprise an array of posts with periodically varying diameters.

2. The connector of claim 1, further comprising a first matrix, the first planar lens disposed in the first matrix and the first optical fiber joined to the first matrix.

3. The connector of claim 2, further comprising a second matrix, the second planar lens disposed in the second matrix and the second optical fiber joined to the second matrix.

4. The connector of claim 1, in which the array of posts comprises lithographically formed posts of a dielectric disposed on a dielectric substrate with a refractive index substantially lower than the posts.

5. The connector of claim 1, in which a height of the posts is approximately half of a wavelength of light designed to be passed through the connector.

6. The connector of claim 1, in which the first planar lens and second planar lens are axially symmetric convergent lenses.

7. The connector of claim 1, in which the posts extend perpendicularly from the substrate, the first planar lens and second planar lens each having an optical axis that is perpendicular to the substrate.

8. The connector of claim 1, in which the first planar lens and second planar lens are polarization insensitive.

9. The connector of claim 1, in which the array of posts are regularly spaced with periodically varying diameters to form a pattern of concentric rings.

10. A method for making an optical connector according to claim 1, the method comprising:
disposing the first planar lens and second planar lens between the first optical fiber and the second optical fiber; and
transmitting light out of the first optical fiber and through the first planar lens and second planar lens, the light being focused into the second optical fiber.

11. The method of claim 10, in which manufacturing the first planar lens comprises a single binary lithography/etching operation.

12. The method of claim 10, further comprising encapsulating the first planar lens in a first block of transparent matrix material.

13. The method of claim 10, further comprising joining the first optical fiber to the first block transparent matrix material to form a first half of a connector.

14. The method of claim 10, further comprising encapsulating the second planar lens in a second block of matrix material, joining the second optical fiber to the second block of matrix material to form a second half of the connector, and joining the first half and second half of the connector by securing a planar face on the first half of the connector to a planar face on the second half of the connector.

15. An optical connector comprising:
a first optical fiber;
a second optical fiber;
a first planar lens positioned to operate on light exiting the first optical fiber to create a predetermined change in a wave front of the light;
a first matrix, the first planar lens disposed in the first matrix and the first optical fiber joined to the first matrix;
a second planar lens positioned to accept the light from the first planar lens, the second planar lens to focus the light onto the second optical fiber; and
a second matrix, the second planar lens disposed in the second matrix and the second optical fiber joined to the second matrix;
in which the first planar lens and second planar lens each comprise a regularly spaced array of dielectric posts with periodically varying diameters, in which the first planar lens and second planar lens are polarization insensitive axially symmetric convergent lenses.

16. The connector of claim 2, further comprising a second matrix, the second planar lens being disposed in the second matrix and the second optical fiber being joined to the second matrix.

17. The connector of claim 16, in which a planar face of the first matrix is secured to a planar face of the second matrix such that light passing out of the first optical fiber passes through the first matrix, first planar lens, second matrix, and second planar lens, and is focused on the second optical fiber.

18. The connector of claim 1, in which the regular array of posts comprises a hexagonal array.

19. The connector of claim 1, in which the array of posts with periodically varying diameters forms a spiral pattern.

20. The connector of claim 1, in which a polarization of light passing through the first planar lens and second planar lens is preserved.

* * * * *